United States Patent [19]

Sugiura et al.

[11] Patent Number: 5,337,301
[45] Date of Patent: Aug. 9, 1994

[54] OPTICAL RECORDING MEDIUM, APPARATUS FOR REPRODUCING THE SAME AND METHOD OF RECORDING AND REPRODUCING THE SAME

[75] Inventors: Satoshi Sugiura; Yuzo Yamakawa, both of Tokorozawa, Japan

[73] Assignee: Pioneer Electronic Corporation, Tokyo, Japan

[21] Appl. No.: 991,748

[22] Filed: Dec. 17, 1992

[30] Foreign Application Priority Data

Jan. 17, 1992 [JP] Japan .................................. 4-006887

[51] Int. Cl.$^5$ ............................................. G11B 7/007
[52] U.S. Cl. ................................. 369/110; 369/275.4
[58] Field of Search ..................... 369/110, 124, 275.4

[56] References Cited

U.S. PATENT DOCUMENTS

| | | | |
|---|---|---|---|
| 3,798,388 | 3/1974 | Dickopp | 179/100.4 R |
| 4,310,910 | 1/1982 | Sheng | 369/116 |
| 4,385,372 | 5/1983 | Drexler | 369/109 |
| 4,736,258 | 4/1988 | Noble et al. | 358/342 |
| 5,218,599 | 6/1993 | Tsuyoshi et al. | 369/275.1 |

FOREIGN PATENT DOCUMENTS

| | | |
|---|---|---|
| 0418879 | 3/1991 | European Pat. Off. ....... G11B 7/00 |
| 0207438 | 11/1984 | Japan . |
| 59-207433 | 4/1985 | Japan . |
| 63-302425 | 4/1989 | Japan . |

OTHER PUBLICATIONS

Optical Engineering, vol. 20, No. 3, Jun. 1981, A. A. Jamberdino, "High–Capacity High–Speed Recording", pp. 388–389.

Primary Examiner—Paul M. Dzierzynski
Assistant Examiner—David V. Bruce
Attorney, Agent, or Firm—Sughrue, Mion, Zinn, Macpeak & Seas

[57] ABSTRACT

The optical recording medium includes: an information recording substrate; and pits formed on the information recording substrate, each of the pits corresponding to a recording information unit comprising a plurality of bits, and having one of predetermined patterns for respectively generating different optical characteristics by projecting a light spot onto the pits.

14 Claims, 10 Drawing Sheets

E-WAVE

H-WAVE

FIG.5A  P5  ⬚⬚☐☐  "1100"
        P6  ☐⬚⬚☐  "0110"
        P7  ☐☐⬚⬚  "0011"
        P8  ⬚☐☐⬚  "1001"

E-WAVE

H-WAVE

E-WAVE

FIG.6C

H-WAVE

FIG.7A

| | | |
|---|---|---|
| P13 | ○□○□ | "1010" |
| P14 | □○□○ | "0101" |
| P15 | □□□□ | "0000" |
| P16 | ○○○○ | "1111" |

FIG.7B

E-WAVE

FIG.7C

H-WAVE

OPTICAL RECORDING MEDIUM, APPARATUS FOR REPRODUCING THE SAME AND METHOD OF RECORDING AND REPRODUCING THE SAME

BACKGROUND OF THE INVENTION

1. Field of the Invention

The present invention generally relates to optical recording media for storing a variety of information, such as image information and audio information, an apparatus for reproducing the information recorded on such optical recording media, and a method of recording and reproducing the information recorded on such optical recording media.

2. Description of the Related Art

Optical recording media, such as optical-disks, are used for recording a large amount of information. An optical disk has a center hole formed at the center thereof, and a plurality of turns of a track spirally formed on a circumferential recording area of the optical disk.

Figure 1A:
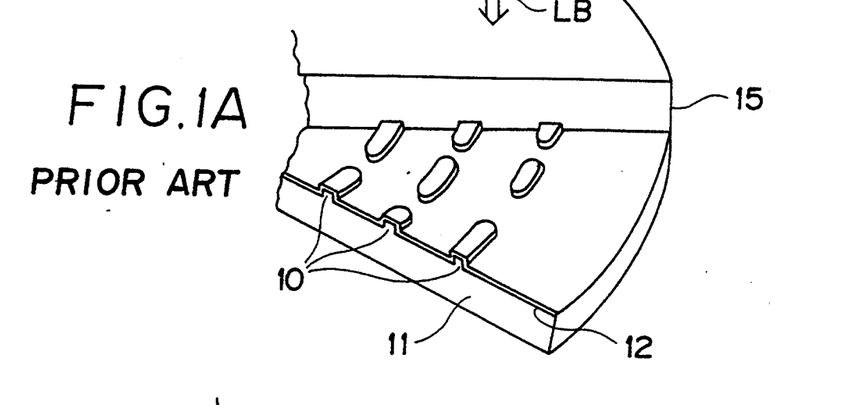
FIGS. 1A, 1B and 1C are diagrams showing an optical recording medium.

As shown in FIG. 1A, an optical disk has a transparent disk substrate 15 made of, for example, PMMA (PolyMethyl MethAcrylate), and information pits 10 are formed on the transparent disk substrate 15 so that they project therefrom. Information pits 10 correspond to information recorded on the optical disk. An aluminum film 12 having a high reflection rate is vapor-deposited on the disk substrate 15 on which the information pits 10 are formed. A protection film 11 made of, for example, plastics is formed on the aluminum film 12.

Figure 1B:
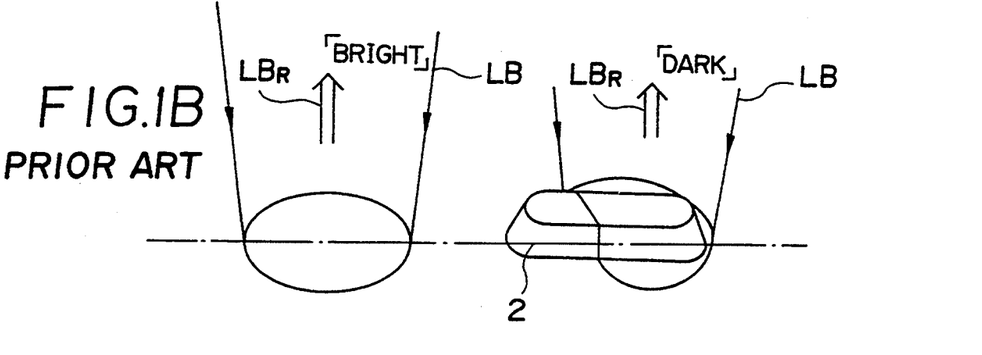
Figure 1C:
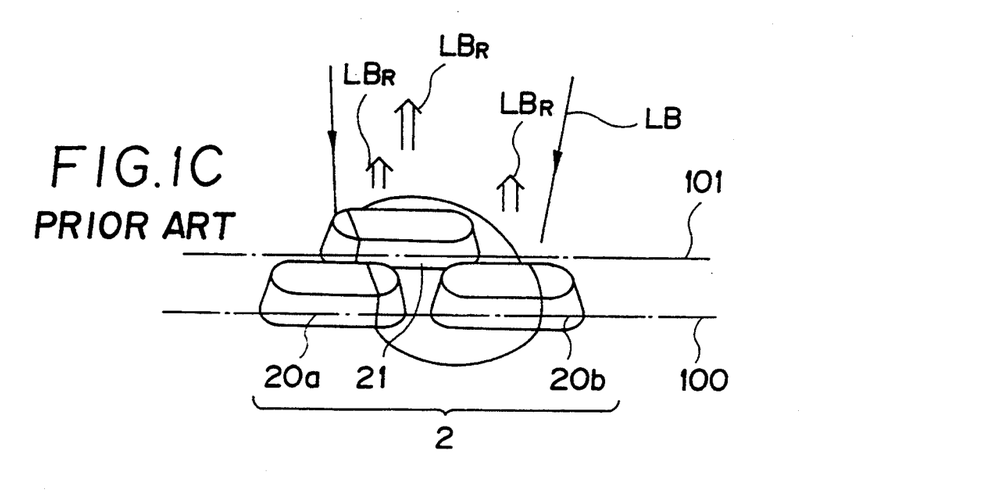

The information recorded on the optical substrate 15 is reproduced as follows. A light beam LB, such as a laser beam, is projected onto the optical disk from the side of the disk substrate 15 so that the light beam LB is projected onto the track. As shown in FIG. 1B, a light beam $LB_R$ reflected by a mirror plane portion between adjacent pits is detected as "a bright light". The information pits 10 irregularly reflect the light, and change the reflection rate so that the amount of the reflected light beam $LB_R$ decreases. Thus, as shown in FIG. 1B, the reflected beam $LB_R$ obtained by projecting the light beam LB onto an information pit portion 2 is detected as "a dim light". As shown in FIG. 1C, information corresponding to recording pits 20a, 20b, 21 . . . of the information pit portion 2 can be reproduced by detecting the "bright" and "dim" reflected lights.

As described above, the recording of information is based on the presence/non-presence of the information pits 10, which modulate the amplitude (intensity) of the reflected light used for reading information recorded on the optical disk. The reproduction of information is carried out by detecting changes in the amount of the reflected light which has been amplitude-modulated by the information pits 10. The presence/non-presence of an information pit corresponds to a one-bit binary signal. In principle, it is possible to increase the recording density by decreasing the distance between adjacent information pits. As the distance between adjacent information pits decreases, it is necessary to reduce the size of the light spot projected on the optical disk. If the light spot does not have a sufficiently reduced size, adjacent information pits will be simultaneously illuminated, as shown in FIG. 1C. This prevents information from being accurately read from the optical disk.

Hence, the optical disk as shown in FIG. 1A has a limited information recording density per unit area.

Japanese Laid-Open Patent Publication No. 50-119517 discloses a recording carrier (recording medium) intended to overcome the above problem. The recording medium disclosed in the above publication has a track area in which at least two types of diffraction lattices having respective lattice lines oriented in different directions are provided. When one track is read, this track serves as an intermediate area between adjacent tracks located on respective sides thereof. With this arrangement, it becomes possible to obtain a recording density approximately twice that of the optical disk shown in FIG. 1A, with respect to a light spot of same size.

However, the recording carrier disclosed in the above mentioned publication has a disadvantage in that a plurality of signal detectors are needed because a plurality of types of diffraction lattices respectively having different directions of diffraction are used. In addition, the recording carrier disclosed in the publication has a recording density increased to be approximately twice that of the optical disk shown in FIG. 1A, and thus cannot provide a drastically increased recording density.

SUMMARY OF THE INVENTION

It is therefore an object of the present invention to increase the recording density of an optical recording medium.

According to the present invention, the above mentioned object can be achieved by an optical recording medium. The optical recording medium includes: an information recording substrate; and pits formed on the information recording substrate, each of the pits corresponding to a recording information unit comprising a plurality of bits, and having one of predetermined patterns for respectively generating different optical characteristics by projecting a light spot onto the pits. For example, one pattern has a maximum of four projections spaced apart from each other at predetermined intervals. Due to the number of projections, the interval between adjacent projections or the positions of the projections, 16 lattice patterns are defined. Hence, one pit indicates four-bit data.

Thus, under the condition that the light spot is of the same size, which is available and used in the aforementioned conventional optical disks, is employed, the information recording density can be greatly increased since the information of a plurality of bits can be reproduced at once from just an area of the optical recording medium corresponding to the size of the light spot. This feature is quite advantageous compared with the aforementioned conventional case, in which the size of the light spot is required to be decreased in order to employ the smaller projection pieces of the pit. In this sense, the conventional technique does not make the best use of the fine manufacturing technique for the pit.

According to the present invention, the above mentioned object can be achieved by an apparatus for reproducing information from the above mentioned optical recording medium. The reproducing apparatus includes: a light projecting device for projecting the light spot of a predetermined size onto the pits; a light receiving device, optically coupled to the light projecting device, for receiving one of a reflected light reflected by each of the pits and a passing-through light passing through each of the pits from the light spot and for generating an electric signal corresponding to the received light; and a pattern identifying device, coupled to the light receiving device, for identifying one of the predetermined patterns for each of the pits by using the electric signal and for generating information corresponding to one of the predetermined patterns for each of the pits.

Thus, just by projecting the light spot so as to cover an area of one pit, the information of a plurality of bits can be reproduced at once form the area of the optical recording medium corresponding to the size of the light spot.

According to the present invention, the above mentioned object can be also achieved by a method of recording information on the above mentioned recording medium and reproducing the information therefrom. The reproducing method includes the steps of: forming pits on the optical recording medium in accordance with information to be recorded, each of the pits corresponding to a recording information unit comprising a plurality of bits, each of the pits having one of predetermined patterns for respectively generating different optical characteristics by projecting a light spot; projecting the light spot of a predetermined size onto the pits; receiving one of a reflected light reflected by each of the pits and a passing-through light passing through each of the pits from the light spot; identifying one of the predetermined patterns for each of the pits by using the received light; and reproducing the information from the identified patterns for each of the pits.

Thus, just by projecting the light spot so as to cover an area of one pit, the information of a plurality of bits can be reproduced at once form the area of the optical recording medium corresponding to the size of the light spot.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENTS

A description will now be given of a preferred embodiment of the present invention.

Figures 2A, 2B:
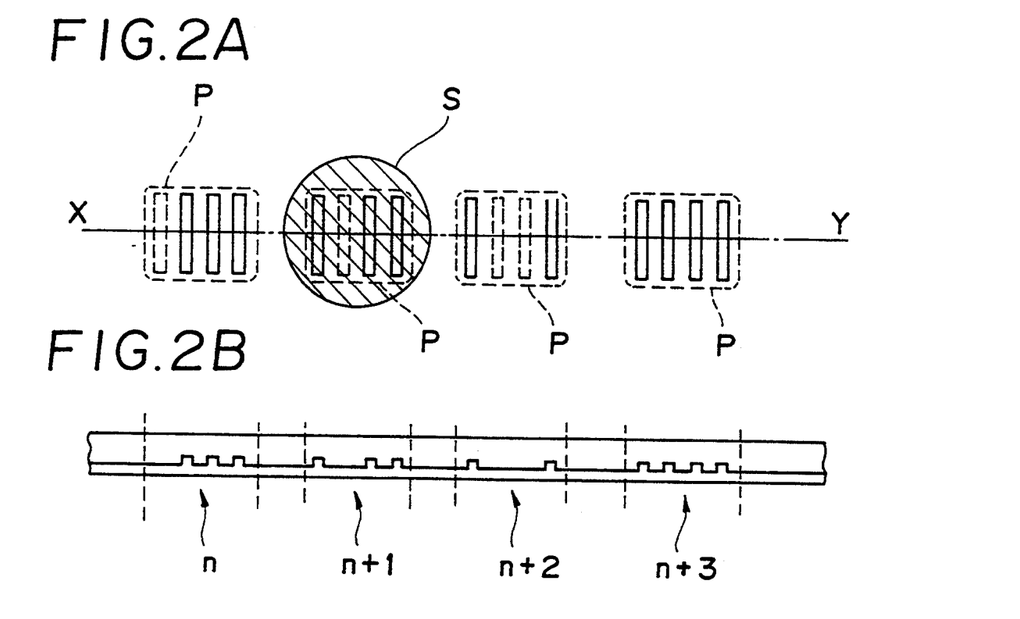
FIGS. 2A, 2B and 2C are diagrams showing information pits formed on an optical disk according to an embodiment of the present invention.
Figure 2C:
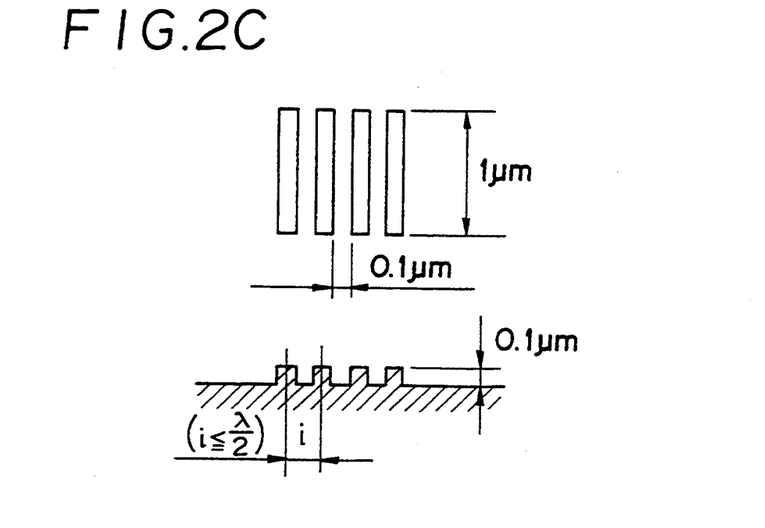

FIGS. 2A, 2B and 2C show information pits formed on an optical disk of a recording medium according to a preferred embodiment of the present invention. FIG. 2A is a plan view showing a string of information pits formed on a track, FIG. 2B is a cross-sectional view taken along a line X-Y shown in FIG. 2A, and FIG. 2C is a diagram showing one information pit. In these figures, P indicates an information pit, and S indicates a spot of a read light projected onto the information pit P.

As shown in these figures, an information pit, which is the unit of reading recorded information, has a lattice pattern having a plurality of projections. The projections are formed on an information recording surface by a fine-manufacturing method such as a 2 P (Photo-Polymer) method. One lattice pattern includes a maximum of four projections spaced apart from each other at predetermined intervals. Due to the number of projections, the interval between adjacent projections or the positions of the projections, 16 lattice patterns are defined. One of the 16 lattice patterns is selected in accordance with recording information and formed on the information recording surface. The lattice patterns selected in accordance with a series of recording information pieces are spirally arranged so that a plurality of turns of an information pit string are formed on the information recording surface. An aluminum film is deposited on the information recording surface. Information recorded on the information recording surface is read by detecting a reflected light obtained by projecting a read light onto the information recording surface. A protection film made of, for example, plastic, may be formed on the aluminum film.

Each of the 16 lattice patterns, or each of the information pits corresponds to four-bits information. For example, a lattice pattern n shown in FIG. 2B indicates "0111", and a lattice pattern n+1 indicates "1011". Similarly, lattice patterns n+2 and n+3 indicate "1001" and "1111", respectively. In this manner, each projection indicates "1", and each predetermined position having no projection indicates "0".

As shown in FIG. 2C, each lattice pattern has dimensions such that the distance between side surfaces of adjacent projections opposite to each other is 0.1 $\mu m$, the length of each projection is 1 $\mu m$, and the height thereof is 0.1 $\mu m$. Further, the interval between the centers of adjacent projections is equal to or less than $\lambda/2$ where $\lambda$ is the wavelength of the read light. The lattice patterns also function as diffraction lattices, and separate the read light into light components. As will be described later, the lattice patterns function to increase the differences between patterns formed by the reflected light, this facilitating identification of the information pits.

Figure 3:
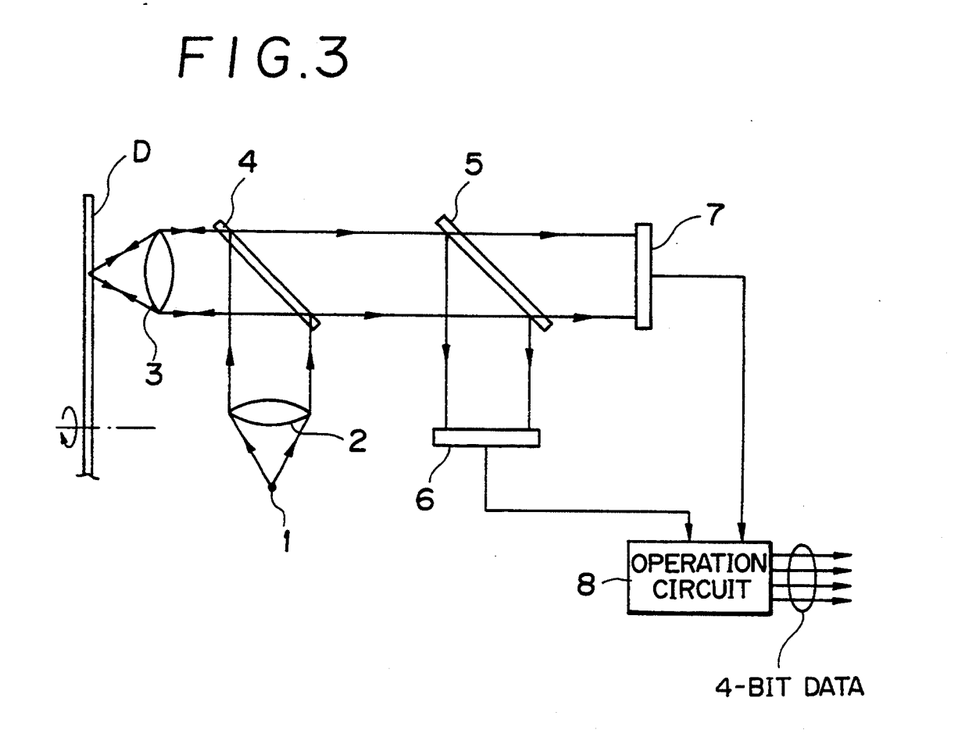
FIG. 3 is a diagram of an optical pickup apparatus according to an embodiment of the present invention.
Figure 4A:
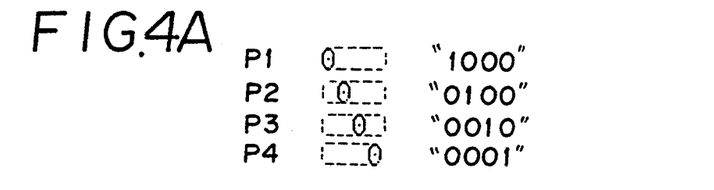
FIGS. 4A, 4B, 4C, 5A, 5B, 5C, 6A, 6B, 6C, 7A, 7B and 7C are diagrams showing scattered patterns of light reflected by 16 lattice patterns respectively serving as information pits formed on an optical disk as shown in FIGS. 2A, 2B and 2C.
Figure 4B:
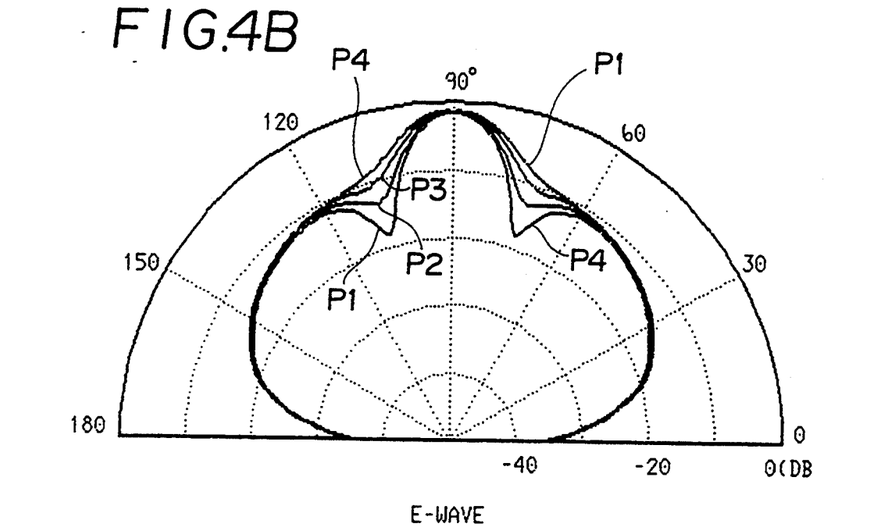
Figure 4C:
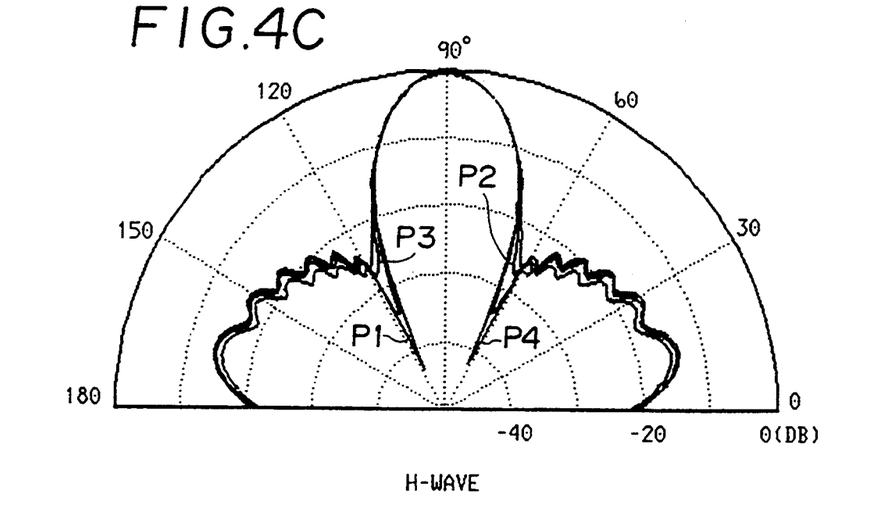
Figure 5A:
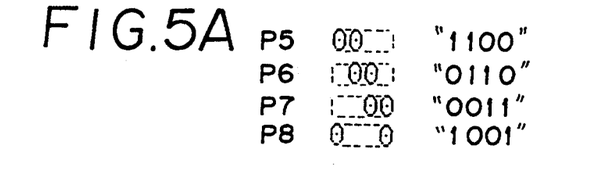
Figure 5B:
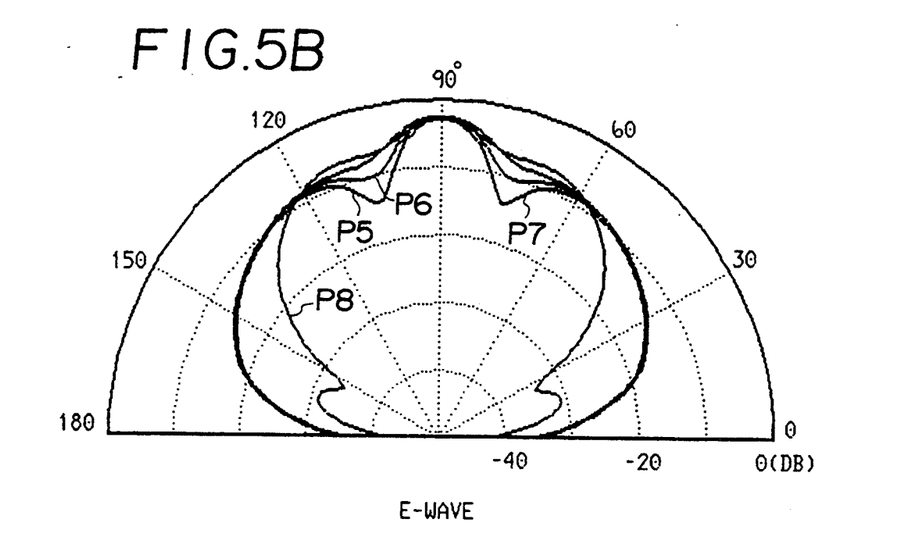
Figure 5C:
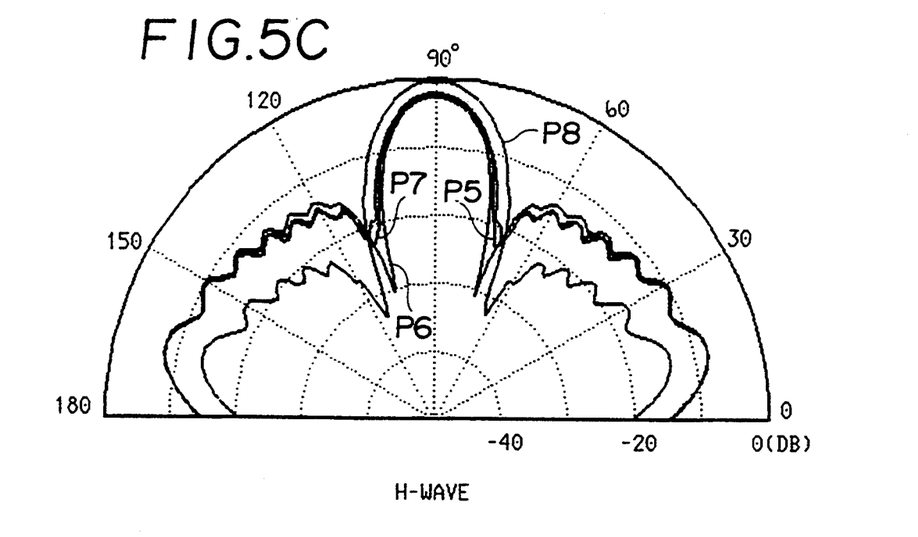
Figure 6A:
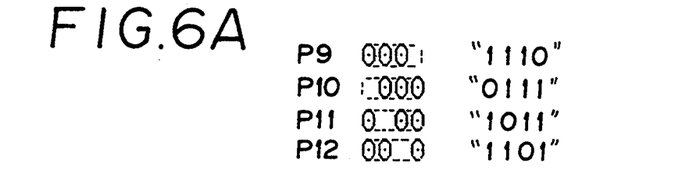
Figure 6B:
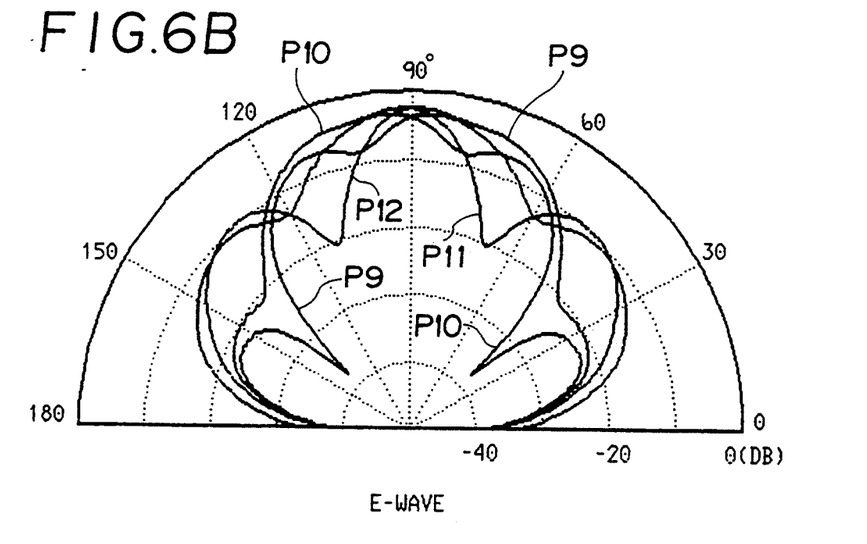
Figure 6C:
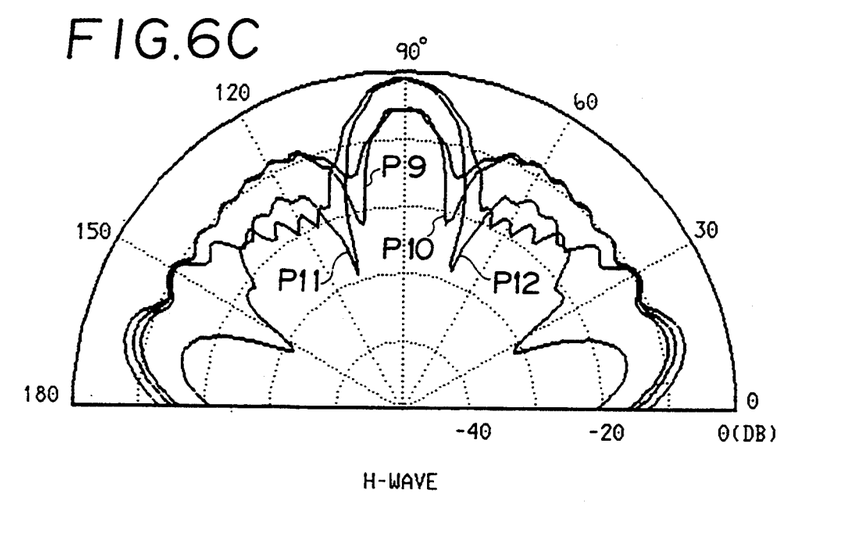

A description will now be given, with reference to FIG. 3, of an optical pickup apparatus for reproducing recorded information from the optical disk described above. The optical pickup apparatus shown in FIG. 3 has the following structural elements. A light source 1 is formed with, for example, a semiconductor laser, and emits a light beam, such as a laser beam. A collimating lens 2 collimates the laser beam emitted from the light source 1. An objective lens 3 converges the collimated laser beam from the collimating lens 2 onto an optical disk D so that a light spot is formed thereon. Further, the objective lens 3 gathers the laser beam reflected by the optical disk D. A semi-transparent mirror 4 reflects the laser beam from the collimating lens 2 so that the laser beam goes to the objective lens 3, and allows the reflected beam gathered by the objected lens 3 to pass therethrough. A polarizing prism 5 receives the reflected light from the objective lens 3 and separates it into an E-polarized light (wave) and an H-polarized light (wave). An E-polarized light detector 6 receives the E-polarized light from the polarizing prism 5 and generates a corresponding electric signal. An H-polarized light detector 7 receives the H-polarized light from the polarizing prism 5 and generates a corresponding electric signal. An operation circuit 8, which functions as a pattern identifying unit, receives the electric signals from the detectors 6 and 7, and determines which one of the 16 lattice patterns is indicated by the electric signals. Then, the operation circuit 8 generates four-bit data corresponding to the identified lattice pattern.

Each of the E-polarized light detector 6 and the H-polarized light detector 7 is made up of a plurality of photoelectric conversion elements (photodetectors) separated from each other in one plane. The operation circuit 8 receives the respective electric signals of the photoelectric conversion elements, and identifies the lattice pattern using these electric signals. The scattering due to the lattice patterns changes most greatly at an angle of 15°–20° with respect to the incidence of light. Hence, it is desirable that one of the photoelectric conversion elements be disposed at a position corresponding to this angle of 15°–20° with respect to the incidence of light. It is also desirable that the read light projected onto the information pits be a circularly polarized light. In order to obtain a circularly polarized light, the light source 1 and the semi-transparent mirror 4 are used. When the light source 1 emits linearly polarized light, it is desirable that the direction of polarization thereof is approximately equal to 45° with respect to the lattice patterns so as to achieve the effect similar to that of the circularly polarized light.

An information reproducing apparatus can be constructed by the above mentioned optical pickup apparatus, a disk driving system for rotating and controlling the optical disk D, a tracking system for positioning the optical pickup apparatus on the track, and a focusing drive system for moving the objective lens 3.

FIGS. 4A–4C through 7A–7C respectively show scattered patterns of light reflected by the 16 lattice patterns. The scattered patterns shown in these figures are obtained under a condition in which the wavelength λ of the read light is equal to 800 nm, and the numerical aperture (NA) of the objective lens is equal to 0.5. FIGS. 4A, 5A, 6A and 7A respectively show four-bit data corresponding to the respective lattice patterns. FIGS. 4B, 5B, 6B and 7B show scattered patterns of the E-polarized waves obtained so that the read light is reflected by the respective lattice patterns. FIGS. 4C, 5C, 6C and 7C show scattered patterns of the H-polarized waves obtained so that the read light is reflected by the respective lattice patterns. In FIGS. 4B through 7B and 4C through 7C, the read light is projected onto the respective lattice patterns corresponding to an angle of 90° with respect to the lattice patterns, and the intensity of the reflected light (0 dB–50 dB) is plotted within the range between 0° and 180°. The distance from the center of the horizontal line connecting angles of 0° and 180° together denotes the intensity of the reflected light.

Figure 7A:
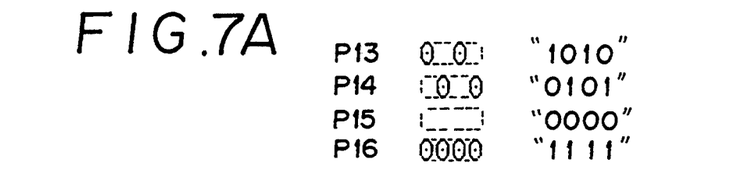
Figure 7B:
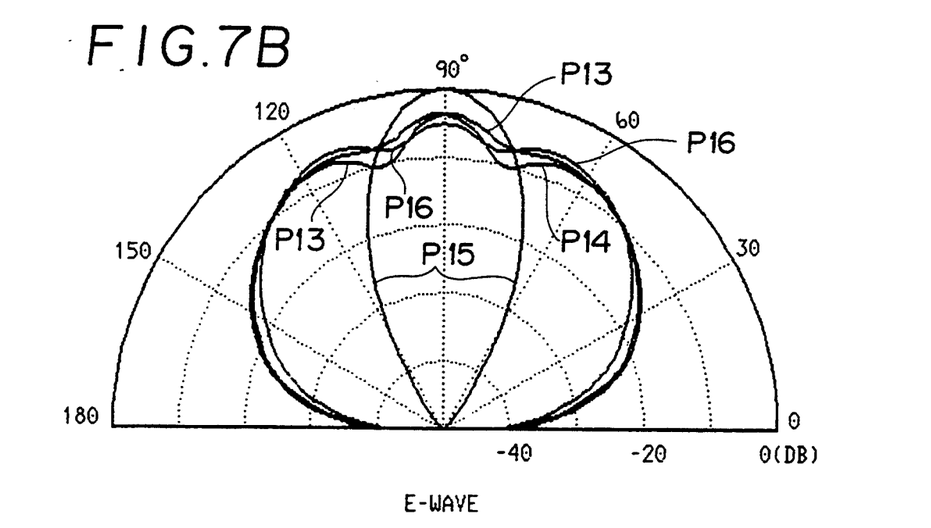
Figure 7C:
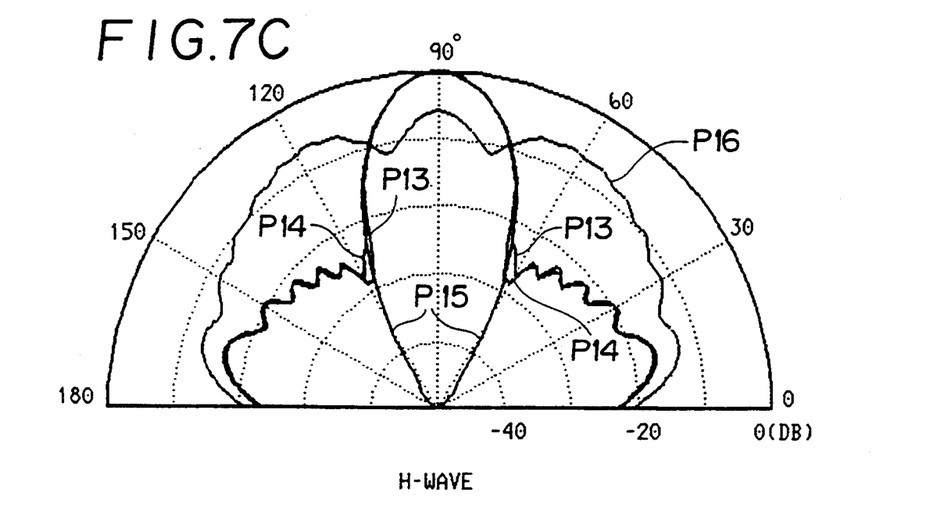

As shown in FIGS. 7A, 7B and 7C, the light reflected by a lattice pattern P15 having no projection is a total reflection pattern, which can be detected by either the E-polarized light or the H-polarized light. Lattice patterns P13 and P14 can be identified by the E-polarized light. A pattern P16 having four projections can be clearly identified by the H-polarized light. As shown in FIGS. 4A, 4B, 4C, 5A, 5B and 5C, the 16 scattered patterns, that is, 16 information pieces can be identified by only the scattered patterns of the E-polarized light. By referring to the H-polarized waves, it becomes possible to more accurately identify the 16 information pieces.

As described above, according to the present embodiment, four-bit information can be indicated by one information pit which is the unit of reading. Hence, information necessary to use four pits in the conventional technique can be represented by one information pit, and the information recording density of the present embodiment is four times that provided by the conventional technique, with respect to a light spot of same size.

Figure 8A:
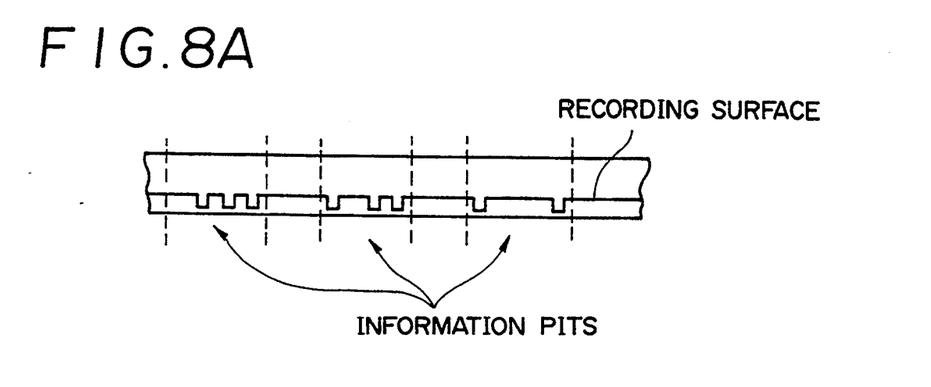
FIGS. 8A, 8B, 9A, 9B, 9C, 10A and 10B are respectively diagrams showing variations of the lattice patterns employed in the present invention.

As shown in FIG. 8A, it is possible to form the lattice patterns using recesses formed on the information recording surface in lieu of the projections. The lattice patterns using recesses can be applied to not only reflection type optical disks but also transparent type optical disks. It is also possible to form the lattice patterns so that they have reflective portions, and non-reflective portions which absorb light or allow light to pass.

The dimensions of the lattice patterns are not limited to the specifically described values. That is, as long as the lattice patterns have enough dimensions to discriminate patterns of the reflected light due to the scattering of light or the like, any dimension of the lattice patterns can be employed. Further, it is possible to further increase the recording density by using an increased number of lattices located in such a range that the patterns of the reflected light can be discriminated from one another. That is, the recording density can be increased by using an increased number of types of lattice patterns. Further, the lattice patterns are not limited to the lattice shapes as has been described previously. That is, as long as the lattice patterns have shapes which generates scattered patterns distinguishable from one another, any shape of the lattice patterns can be employed.

Figure 8B:
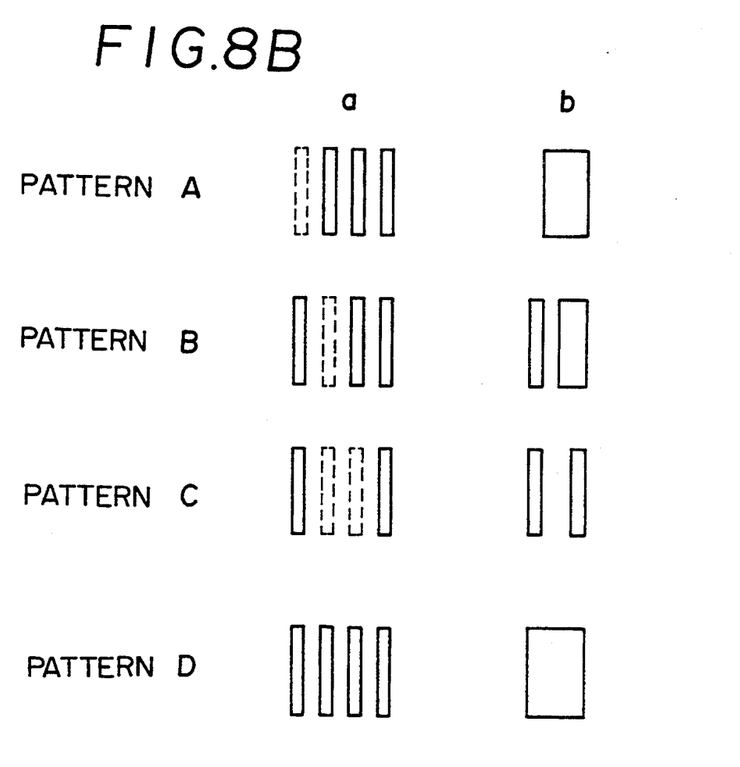

FIGS. 8B, 9A–9C and 10A–10B show lattice shapes different from those described previously. Lattice patterns b in FIG. 8B are obtained by integrally forming adjacent lattices patterns a in FIG. 8B with each other without intervals. By use of the lattice patterns b, the identification of the information can be performed in the same manner as the lattice patterns a.

Figure 9A:
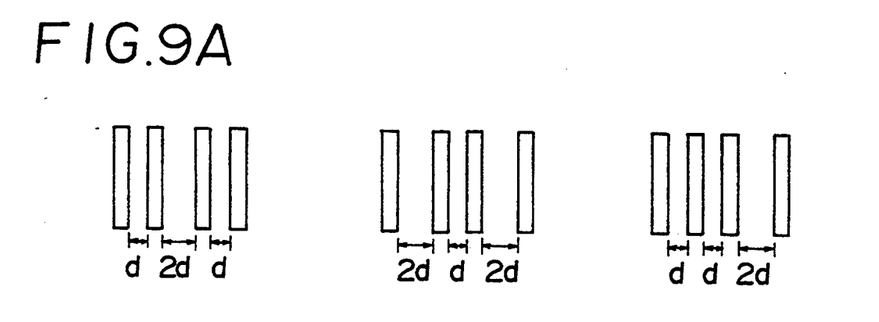
Figure 9B:
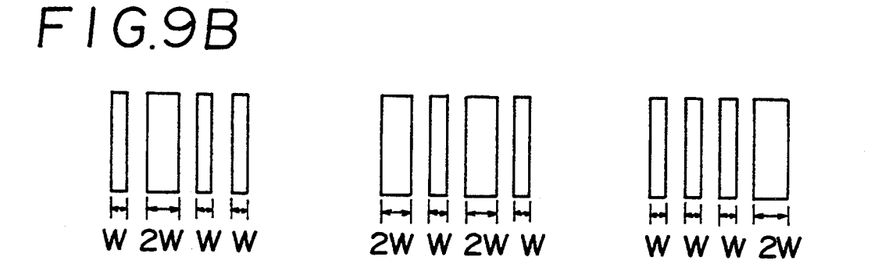
Figure 9C:
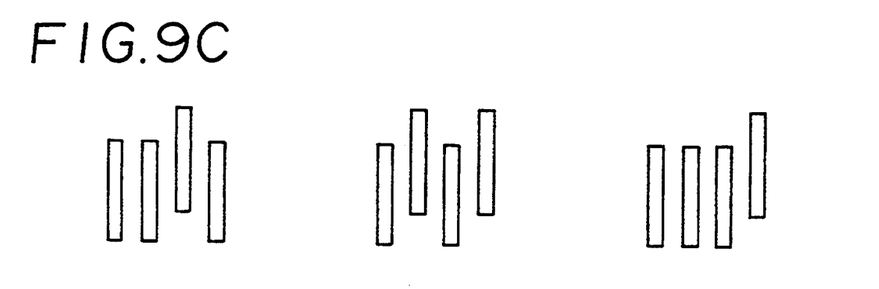

FIG. 9A, the intervals between adjacent lattices are modulated by recording information. The lattice patterns shown in FIG. 9A have two different intervals d and 2d. The ratio of the different intervals is not limited to 2:1. It is also possible to use three or more different intervals between adjacent lattices. FIG. 9B shows lattice patterns, in which the widths of the lattices are modulated by recording information. The lattice pattern shown in FIG. 9B has a projection or recess (lattice) having a width W and a projection or recess (lattice) having a width 2W. FIG. 9C shows lattice patterns, in which the positions of lattices in the longitudinal direction thereof are modulated by recording information.

Figure 10A:
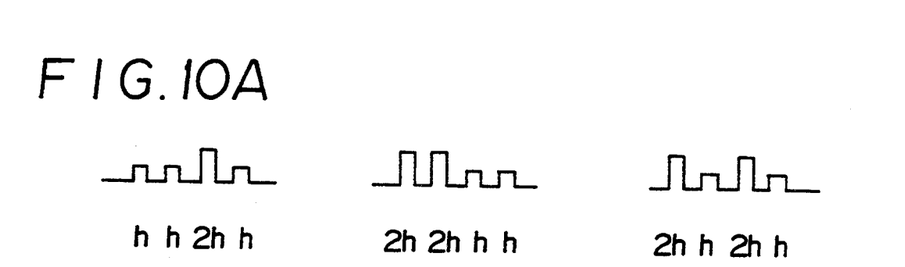
Figure 10B:
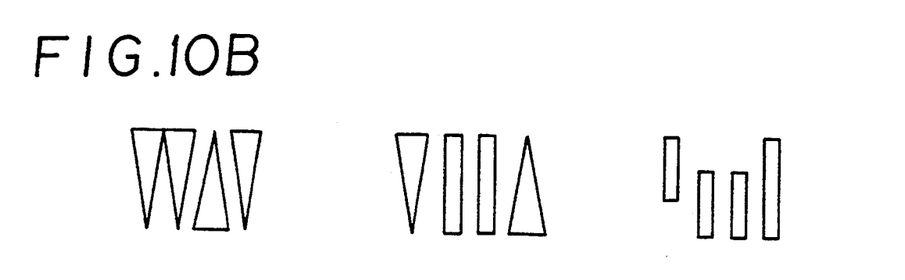

FIG. 10A shows lattice patterns including projections or projections having different heights. FIG. 10B shows lattice patterns including lattices having different shapes. It is also possible to arbitrarily combine the above mentioned lattice patterns in order to effectively identify the scattered patterns of the reflected light.

Information recorded on the information recording surface can be detected as follows. A light source capable of emitting an approximately linearly polarized light is used so that the polarization direction is approximately parallel to the lattice patterns or perpendicular thereto. Alternatively, a polarizing plate is interposed between the light source and the semi-transparent mirror. The polarized light can be detected by only one polarized detector without any polarizing prism in these cases.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical recording medium comprising:
   an information recording substrate; and
   pits formed on the information recording substrate, each of the pits corresponding to a recording information unit comprising a plurality of bits, and having one of predetermined patterns for respectively generating different optical characteristics by projecting a light spot onto the pits, each of said pits having one of a plurality of predetermined patterns for generating respective different scattering characteristics upon projecting a spot of light onto said pits, said patterns comprising lattice patterns each comprising one or more elongated stripe-shaped elements, a number and placement of said stripe-shaped elements varying among said patterns to represented respective ones of said information units.

2. An optical recording medium as claimed in claim 1, wherein each of the pits has one of the predetermined patterns comprising projections formed on the information recording substrate.

3. An optical recording medium as claimed in claim 2, wherein the projections are arranged so that the predetermined patterns are different from each other on the basis of whether the projections are formed at predetermined positions in each of the pits.

4. An optical recording medium as claimed in claim 2, wherein the projections have different widths.

5. An optical recording medium as claimed in claim 2, wherein the projections are spaced apart from each other at different intervals.

6. An optical recording medium as claimed in claim 2, wherein the projections are arranged in different arrangement manners.

7. An optical recording medium as claimed in claim 2, wherein the projections have different heights.

8. An optical recording medium as claimed in claim 1, wherein each of the pits has one of the predetermined patterns comprising recesses formed on the information recording substrate.

9. An optical recording medium as claimed in claim 8, wherein the recesses are arranged so that the predetermined patterns are different from each other on the basis of whether the recesses are formed at predetermined positions in each of the pits.

10. An apparatus for reproducing information recorded on an optical recording medium comprising: an information recording substrate; and pits formed on the information recording substrate, each of the pits corresponding to a recording information unit comprising a plurality of bits, and having one of predetermined patterns for respectively generating different optical characteristics by projecting a light spot onto the pits, said reproducing apparatus comprising:
    light projecting means for projecting the light spot of a predetermined size onto the pits;
    light receiving means, optically coupled to said light projecting means, for receiving one of a reflected light reflected by each of the pits and a passing-through light passing through each of the pits from the light spot and for generating an electric signal corresponding to the received light said light means comprising light separating means for separating the light from the light spot into an E-polarized light and an H-polarized light, E-polarized light receiving means, optically coupled to said light separating means, for receiving the E-polarized light and for generating a first electric signal corresponding to the E-polarized light, and H-polarized light receiving means, optically coupled to said light separating means, for receiving the H-polarized light and for generating a second electric signal corresponding to the H-polarized light.

11. A reproducing apparatus as claimed in claim 10, wherein said light separating means comprises a polarizing prism.

12. A reproducing apparatus as claimed in claim 10, wherein said pattern identifying means comprises means for generating digital information corresponding to the identified predetermined pattern.

13. An apparatus for reproducing information recorded on an optical recording medium comprising: an information recording substrate; and pits formed on the information recording substrate, each of the pits corresponding to a recording information unit comprising a plurality of bits, and having one of predetermined patterns for respectively generating different optical characteristics by projecting a light spot onto the pits, said reproducing apparatus comprising:
    a light source for emitting a laser beam;
    a collimating lens for collimating the laser beam;
    an objective lens for converging the laser beam passing through the collimating lens to thereby project the light spot onto the pits, and gathering light form the light spot;
    a semi-transparent mirror for making the laser beam from the light source go to the objective lens and allowing the light gathered by the objective lens to pass therethrough;
    a polarizing prism for separating the gathered light into an E-polarized light and an H-polarized light;
    an E-polarized light detector for receiving the E-polarized light and generating a first electric signal corresponding to the E-polarized light; and
    an H-polarized light detector for receiving the H-polarized light and generating a second electric signal corresponding to the H-polarized light; and
    an operation circuit for identifying one of the predetermined patterns by using the first and second electric signals.

14. A method for recording information on an optical recording medium and reproducing the information from the optical recording medium, comprising the steps of:
    forming pits on the optical recording medium in accordance with information to be recorded, each of the pits corresponding to a recording information unit comprising a plurality of bits, each of the pits having one of predetermined patterns for respectively generating different optical characteristics by projecting a light spot onto the pits;

projecting the light spot of a predetermined size onto the pits;

receiving one of a reflected light reflected by each of the pits and a passing-through light passing through each of the pits from the light spot;

separating the light from the light spot into an E-polarized light and an H-polarized light, said and said H-polarized light being respectively received;

identifying one of the predetermined patterns for each of the pits by using the received light by using at least one of said received E-polarized light and said receiving H-polarized light; and reproducing the information from the identified patterns for each of the pits.

* * * * *